July 25, 1967     I. R. RINKEWICH     3,332,624

TURRET LAWN SPRINKLER WITH OSCILLATING MECHANISM

Filed Jan. 28, 1965     2 Sheets-Sheet 1

INVENTOR.
ISAAC R. RINKEWICH

BY
Briskin & Goldfarb
ATTORNEYS

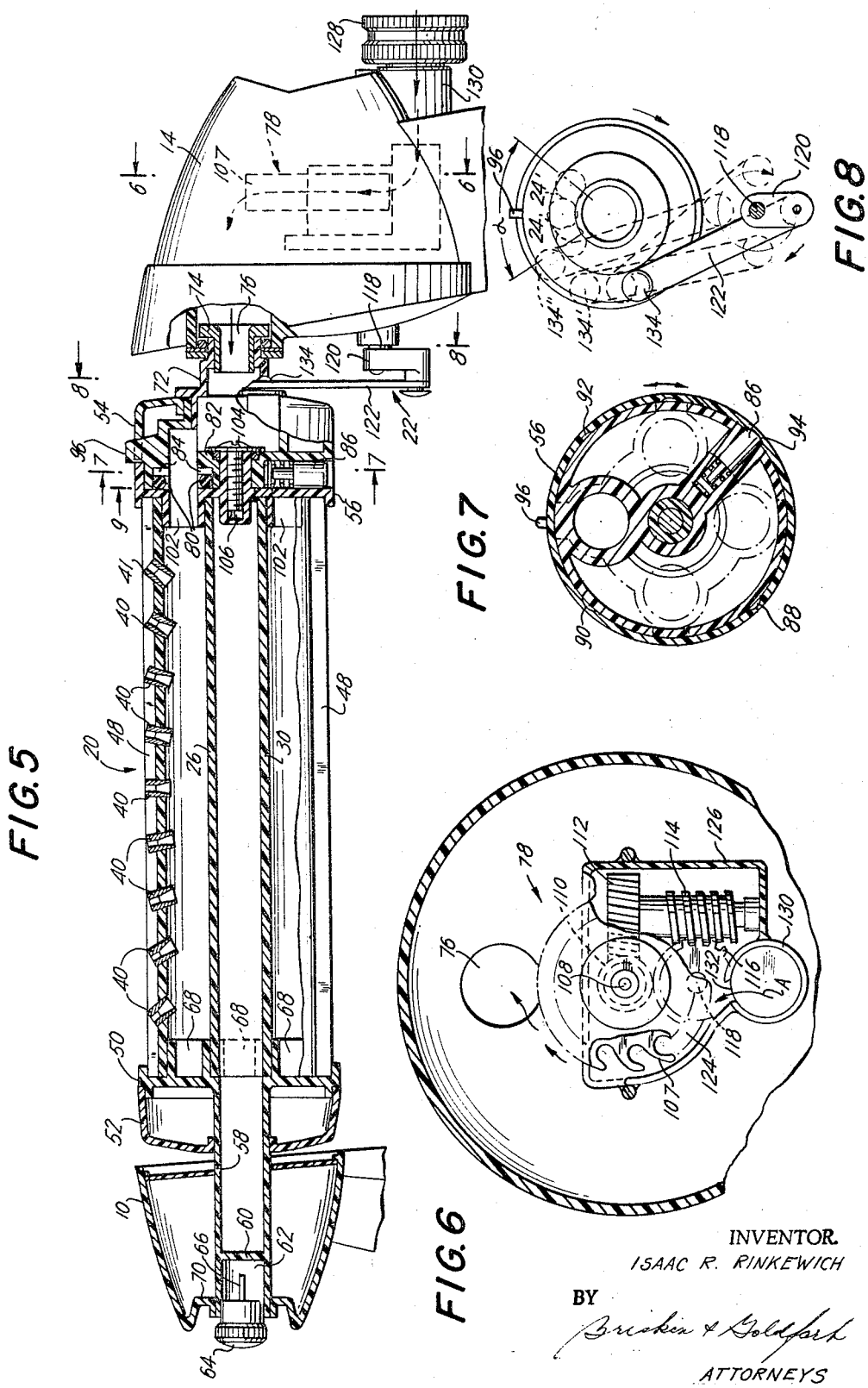

United States Patent Office 3,332,624
Patented July 25, 1967

3,332,624
TURRET LAWN SPRINKLER WITH OSCILLATING MECHANISM
Isaac R. Rinkewich, New York, N.Y., assignor to First Research Corporation, a corporation of New York
Filed Jan. 28, 1965, Ser. No. 428,711
12 Claims. (Cl. 239—242)

This invention relates to a turret lawn sprinkler, and more particularly to a lawn sprinkler wherein the width and distance of an oscillating sprayed water trajectory may be varied in a simple manner by rotatably indexing the turret of a barrel.

It is an object of the present invention to provide a lawn sprinkler which can be set selectively to direct an oscillating stream or spray of water a relatively short distance and a relatively longer distance than was heretofore possible, and which can also be set to selectively vary the width of the stream.

It is a further object of the invention to provide an oscillating lawn sprinkler which is controllable to selectively change the pattern and area of coverage of the water spray.

Another object of the invention is to provide a lawn sprinkler with an indicator dial which can be manually set for selective choice of the length and width of water spray to cover a desired lawn area.

Another object of the invention is to provide a lawn sprinkler which will propel water in powerful, uniformly spaced jet streams.

Still another object of the invention is to provide an oscillating lawn sprinkler which can be easily selectively adjusted to provide uniform water sprinkling coverage in a variety of areas measuring as narrow as 10 feet wide and as long as 90 feet.

Still another object of the invention is to provide an oscillating lawn sprinkler which will propel water in uniformly spread jet streams virtually unaffected by wind and gusts, thus assuring maximum coverage and even water distribution.

A further object of the invention is to provide a lawn sprinkler with economical and effective sealing means so as to prevent leakage during indexing thereof to change its spray pattern.

Still another object of the invention is to provide a lawn sprinkler which will be simple to maintain and which has a clean-out pin provided as part of the sprinkler device for cleaning out nozzle holes.

Still another object of the invention is to provide a lawn sprinkler with a water driven hydraulic motor which is simple and durable in construction and which is effectively sealed against dirt, grit and foreign matter, and which requires a minimum of maintenance.

Still another object of the invention is to provide a lawn sprinkler which can selectively direct jet streams of water of selectively different configurations and selectively different angles in order to obtain different widths and lengths of spray trajectories.

To these ends, and in accordance with one feautre of the invention, I provide a lawn sprinkler having a tail section and a head section with a water-driven oscillating fluid motor. Between the head end section and tail end section of the device is mounted a multiple tube barrel member, each tube of the barrel member being provided with a different number of nozzles, each nozzle being directed at a selected angle and having a predetermined bore for squirting a jet stream of water from the respective tube a desired distance and direction. The multiple tube water distributor barrel is mounted so as to be rotatably indexed to a plurality of positions about its central longitudinal axis, and only one of the plurality of tubes transmits water and ejects it outwardly through its nozzles at any one indexed setting. The entire multiple tube barrel assembly is mounted for oscillation through a predetermined arc by a crank connected to the fluid oscillating motor.

According to another feature of the invention, each tubular chamber of the multiple tube barrel member is provided with a plurality of nozzles inserted in the radially outer wall of a respective chamber at various fanning-out angles in order to determine the direction of the water jet stream issuing therefrom. The bore size of the nozzles and their arrangement produces a fanned-out group of jet streams which will not disintegrate into a mist type of spray. To accomplish this result, the nozzles are each preferably provided with a bore which tapers or converges outwardly.

According to another feature of the invention, an opening at the water-entry end of the barrel member is effectively sealed by an O-ring and a novel ring seat therefor, the seat being provided with grooves to permit the water pressure entering into the tubular chamber passage to flow in behind the O-ring and force it back against the seat in the direction of the head end, thus providing an efficient and effective seal and preventing the O-ring from being extruded into the water-delivery chamber by the water pressure while the multiple tube barrel member is being indexed or rotated about its longitudinal axis.

According to another feature of the invention, the multiple chamber barrel member is provided with a spring-biased indexing plunger and with a dial for rotatively selecting one of the plurality of horizontal tubular chambers through which the water passes to be sprayed out through a particular set of nozzles.

Another feature of the invention is the provision of a clean-out pin, preferably made of plastic, for cleaning out the bores of the individual nozzles, and conveniently affixed to the end of a knob which is inserted in the tail end of the supporting frame for ready access when needed.

These, together with various ancillary objects and other features of the invention which will become more apparent as the following description proceeds, are attained by this article of manufacture, preferred embodiments of which are illustrated in the accompanying drawings by way of example only, wherein:

FIG. 5 is an enlarged cut-away side view of the upper portion of the device of FIGS. 1 and 2 taken along the planes of line 5—5 of FIG. 2;

FIG. 6 is a fragmentary detail of an end view of the fluid-driven motor taken along the plane of line 6—6 of FIG. 5;

FIG. 7 is a cross section taken along the plane of line 7—7 of FIG. 5;

FIG. 8 is a detailed view taken along the plane of line 8—8 of FIG. 5; and

Figure 1:
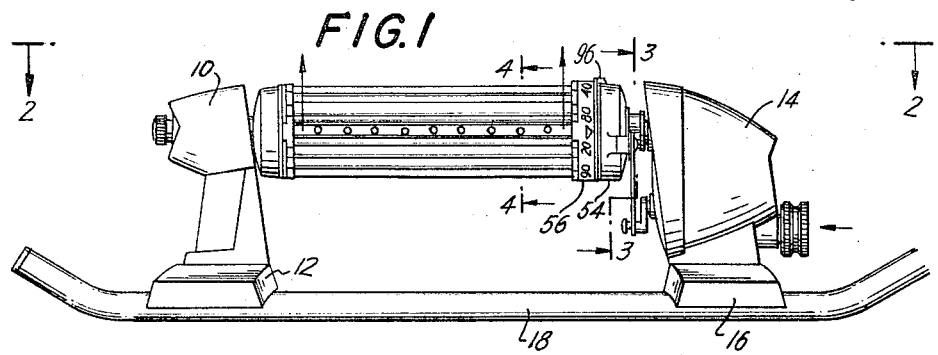
FIG. 1 is an elevational side view of the lawn sprinkler according to the invention.
Figure 2:
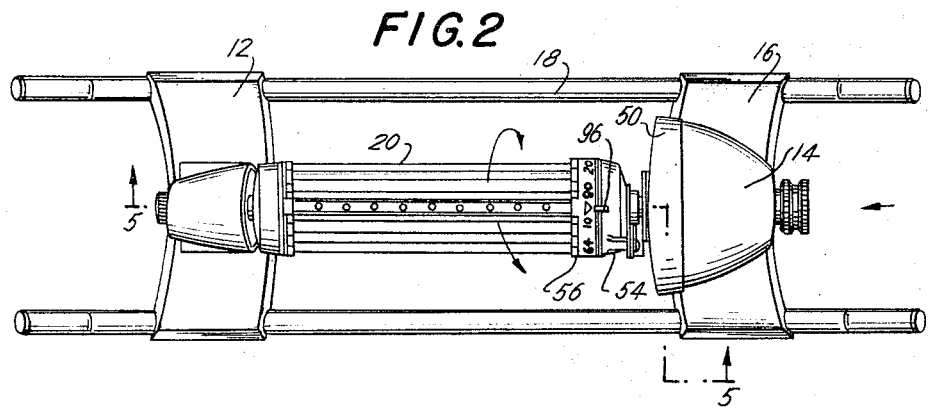
FIG. 2 is a plan view of the device taken along the plane of line 2—2 of FIG. 1.
Figure 3:
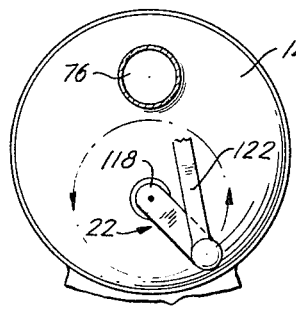
FIG. 3 is a detail showing the oscillating crank and taken along the planes of line 3—3 of FIG. 1.
Figure 4:
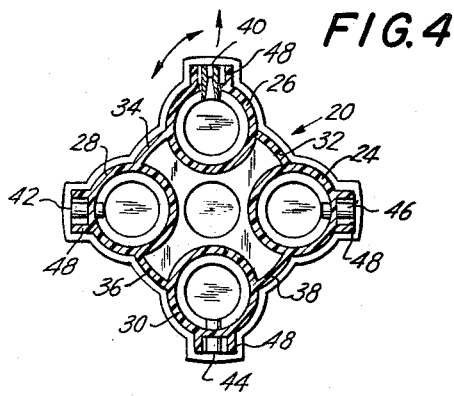
FIG. 4 is a transverse section taken through the distributor chambers of the multiple tube distributor, taken along the plane of line 4—4 of FIG. 1.

In the drawings, the same reference characters are used for the same components throughout the several views. As shown in the drawings, the oscillating lawn sprinkler according to the invention comprises a tail end support 10 having a pedestal 12, and a head end support 14 having a pedestal 16, each pedestal being fixed to and bridging across a pair of tubular base members 18, 18. A barrel member 20 is rotatably journaled in the tail end support 10 and the head end support 14 for continuous oscillating motion through a constant arc about the longitudinal axis of the barrel member 20. The oscillation is provided by an oscillating crank drive indicated generally by the numeral 22 and driven by a fluid operated motor within the head end housing 14.

The barrel member 20 comprises a plurality of parallel tubes 24, 26, 28, 30 integrally joined with each other at 32, 34, 36, 38 by barrel portions which form the intermediate surfaces of the barrel member between the respective tubes. The tubes 24, 26, 28, 30 each define a chamber which is blind at the tail end of the barrel 20, and each tube is provided with a different number of bored nozzles 40, 42, 44, 46. The nozzle bores are tapered to converge outwardly so as to issue a powerful jet stream from each nozzle rather than a mist-type spray. Beginning from the head or inlet end of a typical channel tube 26, the first nozzle 41 in a respective group of nozzles 40 is preferably made with a slightly larger bore to compensate for the initial drop in static pressure at the chamber entrance and thus to issue approximately the same length of jet stream as the other nozzles in the same tubular channel. The bores of the other nozzles 40 in any one tubular channel may all be of uniform size, slightly smaller than the bore of the first nozzle 41. For example, the first nozzle 41 may have a bore of 0.078 inch, while the other nozzles 40 of the same tube 26 may each have a bore of 0.067 inch. One or more of the sets of nozzles 42, 44, 46 in the other tubes 28, 30, 24 may have a different or larger diameter as compared to the bores of nozzles 40.

Each of the tubular members 24, 26, 28, 30 is provided with a pair of radially projecting ribs 48, one rib being on each side of the nozzles 40, 42, 44, 46, to help protect the latter from damage. The barrel member 20 is provided at its head with an indexing head 50 in which the barrel 20 may be rotated and set into a plurality of predetermined positions corresponding to the number of individual tubes 24, 26, 28, 30 provided in the barrel member. In the illustrated embodiment, four tubes are provided, and there are therefore four positions to which the barrel member may be indexed.

As shown in FIG. 5, the barrel member 20 comprising tubular members 24, 26, 28, 30 has a rear end member 58 having a hollow shaft and a cover 50 nesting within a rear end housing 52. The head end of a barrel member 20 is closed off by an indexing housing cover 54 which has an indexing ring 56 marked with suitable indicia, for example, 10' x 90'; 20' x 80'; 40' x 70'; and 50' x 64', to designate the respective area coverage in width and length of the corresponding individual tubes 24, 26, 28, 30. The barrel member 20 is rotatably journaled in the tail member 10 and the head member 14.

The rear end member 58 comprises a central tube portion having a wall 60 therein defining end cavity 62 in hollow shaft 58. In cavity 62 there is removably placed, a knob 64 having a plastic pin 66 affixed thereto of a diameter approximating the size of the orifice in the nozzles 40 for cleaning the latter. The knob 64 with its pin 66 is conveniently held in the opening 62 for ready removal and use when needed. The barrel end of the hollow shaft 58 comprises the flat circular end portion 50 having a circumferential lip portion seated within the rear end housing 52, and is further provided with hollow end plugs 68 fitting into the tail ends of the respective tubes 24, 26, 28, 30 of the barrel member 20. The end member or hollow shaft 58 thus serves to journal the tail end of the barrel 20 together with its rear end housing 52 in the bearing portion 70 of the tail member 10.

The index housing cover 54 at the head end of the barrel 20 is provided with a stepped sleeve 72 into which is inserted a shoulder sleeve 74 for journaling the head end of the barrel assembly 20, 54 in the housing 14. The shoulder sleeve 74 and the stepped sleeve 72 together define a passage 76 therethrough for water flowing from the motor, generally indicated by the numeral 78 in FIGS. 5 and 6, into a selectively indexed one of the individual tubes 24, 26, 28, 30. The barrel assembly 20 is sealed at both ends by press-fits into the member 54 at the head end and into wall 50 of the rear end member 58, and the respective joined plastic parts are cemented together with a suitable plastic cement, such as methyl ethyl ketone. The nozzles 40, 41 are preferably made of brass, while the barrel 20 is preferably a high impact plastic, for example, a modified acrylic plastic.

Figure 9:
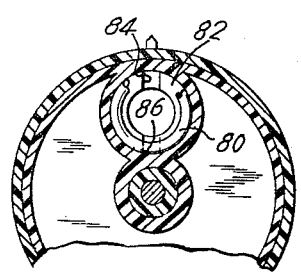
FIG. 9 is a view taken along the plane of line 9—9 of FIG. 5.

As best shown in FIG. 9, an O-ring 80, of rubber or rubber-like material is provided and seated in a novel seat or gland 82, which is provided with a pair of diametrically opposed grooves 84, 86 in the gland and indexing ring, respectively, across which the O-ring 80 is seated. The groove 84 is formed in the wall of the gland or seat 82 of the O-ring 80. As shown in FIGURE 9, the pair of diametrically opposed grooves 84, 86 are formed in the gland 82 and indexing ring wall 56 to create a back pressure of water so as to force the O-ring 80 to seat against the opposed seating surface or wall of the indexing ring 56. The purpose of the grooves 84, 86 is to allow water entering through passage 76 and traveling toward and into the individual indexed tube 26 to enter through the groove 84, 86 behind the O-ring and press the O-ring 80 toward the left relative to FIG. 5 and thus seal the O-ring against the inner left hand wall of the indexing ring 56 to complete the seat, thus providing a proper seal even during the indexing of the member 56. The indexing ring and wall of the seat 82 formed around the O-ring 80 thus prevent the O-ring 80 from being extruded into the center passage 76 while the barrel is being indexed to a new setting, and maintain water pressure against the inflow side of the O-ring to press the O-ring against its seat.

Indexing of the barrel member 20 is accomplished by providing a spring-biased detent or indexing plunger 87 (FIGS. 5 and 7) which engages a particular one 94 of a plurality of recesses 88, 90, 92, 94 located on the internal surface of the indexing housing 56. A raised pointer 96 fixed to the housing 54 cooperates with a respective arrow or triangle which forms part of the indicia on the indexing ring 56 to indicate the character of a particular one of the tubes 24, 26, 28, 30. The barrel 20 is locked into a respective indexed position by the detent 87 nesting in a respective one of its recesses.

The indexing ring 56 comprises a wall portion with protruding sleeves 102 cemented into the inlet ends of the respective tubes 24, 26, 28, 30 and an intermediate wall portion on the opposite side of the plunger 86 and forming part of the housing cover 54. A screw 104 threaded into an opening 106 in the wall member 56 securely fastens the cover 54 to the indexing ring 56 and secures the seat 82 on one side of the O-ring and the indexing ring wall 56 on the other side thereof.

The motor 78 is provided with a series of reduction gears to provide a constant oscillation of the barrel member 20 through a predetermined arc, for example 90°. The desired width or length of a spray is controlled by indexing or dialing the barrel 20 to different respective indexed positions.

The motor 78, as best shown in FIG. 6, comprises an impeller wheel 107 provided with a shaft 108 on which is mounted a worm 110 engageable with a worm gear 112 on a common shaft with another worm 114 engageable with a further worm gear 116 on whose shaft 118 is mounted the crank lever 120 and connecting link 122 of the crank mechanism 22 which oscillates the barrel member 20 back and forth. A transparent plastic wall 124 having an opening for the shaft 108 therethrough seals off the reduction gears and worms 110, 112, 114, 116 from dirt and grit within a gear housing 126 fastened to the inner wall of the head end housing 14.

Water enters into the device at approximately 60 p.s.i. through a hose fitting 128 (FIG. 5) into the conduit 130 and passes through the tangential slot 132 (FIG. 6) in the side thereof in the direction of arrow A of FIG. 6, to rotate the impeller wheel 107 in a clockwise direction. The water then exits through passage 76 in sleeve 74, passes through the housing cover 54 and into the particular individual tube 24, 26, 28 or 30 which has been indexed into the upper position opposite the indicator 96.

As shown in FIG. 8, the connecting pivot point 134 at the upper end of linking arm 122 swings back and forth as the crank 120 turns with its shaft 118, thus oscillating a particular tube 26, for example, back and forth through the angle α from position 24 to position 24' as the pivot point 134 passes through positions 134' and 134".

The angle α of FIG. 8 is approximately 90 degrees. By oscillating the relatively few nozzles 40, 41 of a respective tube, it is possible to obtain a highly directed series of jet streams, more so than if the sprinkler were stationary with a large number of holes. The pressure of water entering into the tube through passage 76 is permitted to build up in the tube, while the barrel 20 oscillates through a 90° arc. This makes it possible to cover more distance and provide better control for a desired pattern of spray and coverage of a desired area. Because of the relatively fewer openings as compared to the prior art, the pressure within the individual tube 24, 26, 28, or 30 builds up, there being a lower pressure drop because of the fewer openings.

It will be obvious to those skilled in the art, upon a study of this disclosure, that this invention permits of various modifications and alterations with respect to the individual components and arrangements disclosed, and hence can be embodied in lawn sprinklers other than as particularly illustrated and described herein, without departing from the essential features of the invention and within the spirit and scope of the claims annexed hereto.

I claim:

1. A lawn sprinkler comprising a base, a multiple tube barrel member, mounting means for rotatably supporting said barrel member on said base, said mounting means including a head end section, means connecting said head section with a source of fluid to be dispensed, said head section having a fluid outlet, said barrel member including a plurality of discrete parallel tubes integrally formed throughout the major portion of their lengths and each having a plurality of nozzles associated therewith, indexing means for selectively aligning a selected one of said tubes with said fluid outlet, and oscillating means for oscillating said barrel member while said selected one of said tubes remains in alignment with said fluid outlet so that fluid will be dispensed through the nozzles of said selected one of said tubes in a predetermined pattern.

2. A lawn sprinkler according to claim 1, wherein the respective nozzles of one of said tubes are of different size with respect to the nozzles of the other tubes, each of said nozzles defining a tapering portion narrowing outwardly and having a tubular portion extending downstream from said tapering portion.

3. A lawn sprinkler according to claim 1, wherein each of said tubes has a different number of nozzles associated therewith.

4. A lawn sprinkler comprising a base, a tail section and a head end section on said base, a multiple tube barrel member, mounting means for rotatably supporting said barrel member between said tail section and head end section, means connecting said head section with a source of fluid to be dispensed, said head section having a fluid outlet, said barrel member including a plurality of discrete parallel tubes integrally formed throughout the major portion of their lengths, each of said tubes having an open end and a plurality of nozzles associated therewith, indexing means for selectively aligning the open end of a selected one of said tubes with said fluid outlet, and oscillating means for oscillating said barrel member while said selected one of said tubes remains in alignment with said fluid outlet so that fluid will be dispensed through the nozzles of said selected one of said tubes in a predetermined pattern.

5. A lawn sprinkler according to claim 4, wherein each of said tubes has a closed end adjacent said tail section.

6. A lawn sprinkler comprising a base, a multiple tube barrel member, mounting means for rotatably supporting said barrel member on said base, said mounting means including a head end section, means connecting said head section with a source of fluid to be dispensed, said head section having a fluid outlet, said barrel member including a plurality of discrete parallel tubes integrally formed throughout the major portion of their lengths, said tubes each having an open end and a plurality of nozzles associated therewith, indexing means associated with said barrel member and said head end section for selectively aligning the open end of a selected one of said tubes with said fluid outlet, and oscillating means connected to said head end section and said barrel member for oscillating said barrel member while said selected one of said tubes remains in alignment with said fluid outlet so that fluid will be dispensed through the nozzles of said selected one of said tubes in a predetermined pattern.

7. A lawn sprinkler according to claim 6, including O-ring sealing means between said head end section and said barrel member to prevent flow of fluid out of said lawn sprinkler except through said nozzles.

8. A lawn sprinkler comprising a base, a tail section and a head end section on said base, a multiple tube barrel member, mounting means for rotatably supporting said barrel member between said tail section and said head end section, means connecting said head section with a source of fluid to be dispensed, said head section having a fluid outlet, said barrel member including a plurality of discrete parallel tubes integrally formed throughout the major portion of their lengths, said tubes each having an open end and a plurality of nozzles associated therewith, indexing means associated with said barrel member and said head end section for selectively aligning the open end of a selected one of said tubes with said fluid outlet, said tubes having their opposite ends closed, and oscillating means for oscillating said barrel member while said selected one of said tubes remains in alignment with said fluid outlet so that fluid will be dispensed through the nozzles of said selected one of said tubes in a predetermined pattern.

9. A lawn sprinkler comprising a base, a tail section and a head end section on said base, a multiple tube barrel member, mounting means for rotatably supporting said barrel member between said tail section and said head end section, means connecting said head section with a source of fluid to be dispensed, said head section having a fluid outlet, said barrel member including a plurality of discrete parallel tubes integrally formed throughout the major portion of their lengths, said tubes each having an open end and a plurality of nozzles associated therewith, indexing means associated with said barrel member and said head end section for selectively aligning the open end of a selected one of said tubes with said fluid outlet, said tubes having their opposite ends closed, and oscillating means for oscillating said barrel member while said selected one of said tubes remains in alignment with said fluid outlet so that fluid will be dispensed through the nozzles of said selected one of said tubes in a predetermined pattern, the respective nozzles of each of said tubes being of different sizes with respect to the nozzles of the other tubes.

10. A lawn sprinkler according to claim 9, wherein each of said tubes has a different number of nozzles associated therewith, each of said nozzles defining a conical tapering portion narrowing outwardly and having a substantially cylindrical tubular portion extending downstream from said tapering portion.

11. A lawn sprinkler comprising a base, a tail section and a head end section on said base, a multiple tube barrel member, mounting means for rotatably supporting said barrel member between said tail section and said head end section, means connecting said head section with a source of fluid to be dispensed, said head section having a fluid outlet, said barrel member including a plurality of parallel discrete tubes integrally formed throughout the major portion of their lengths, said tubes each having an open end and different numbers of a plurality of nozzles associated therewith, indexing means associated with said barrel member and said head end section for selectively aligning the open end of a selected one of said tubes with said fluid outlet said tubes having their opposite ends closed, O-ring sealing means associated with said head end section and said barrel member to prevent flow of fluid out of said lawn sprinkler except through said nozzles, and said oscillating means connected to said head end section and said barrel member for oscillating said barrel member while said selected one of said tubes remains in alignment with said fluid outlet so that fluid will be dispensed through the nozzles of said selected one of said tubes in a predetermined pattern.

12. A lawn sprinkler according to claim 11, said O-ring sealing means comprising an O-ring and a gland having a pair of opposed surfaces for seating said O-ring, said gland having a pair of diametrically opposed grooves on one of said surfaces for admitting the fluid to be dispensed against one side of said O-ring for sealingly pressing said O-ring against said other gland surface.

References Cited

UNITED STATES PATENTS

| | | | |
|---|---|---|---|
| 1,730,248 | 10/1929 | Shaffer | 239—242 X |
| 1,751,960 | 3/1930 | Veenstra. | |
| 1,967,304 | 7/1934 | Gray | 239—550 X |
| 2,145,189 | 1/1939 | Nathan et al. | 277—173 |
| 2,631,058 | 3/1953 | Ingham et al. | 239—561 X |
| 2,859,064 | 11/1958 | Nelson. | |
| 3,081,950 | 3/1963 | Rinkewich | 239—561 X |
| 3,115,305 | 12/1963 | Rinkewich | 239—242 |

FOREIGN PATENTS 273,802   5/1930   Italy.

M. HENSON WOOD, Jr., *Primary Examiner.*

V. C. WILKS, *Assistant Examiner.*